Aug. 23, 1932.  L. A. GEBHARD  1,873,838
TEMPERATURE REGULATING APPARATUS FOR SIGNALING DEVICES
Filed June 11, 1929  2 Sheets-Sheet 1
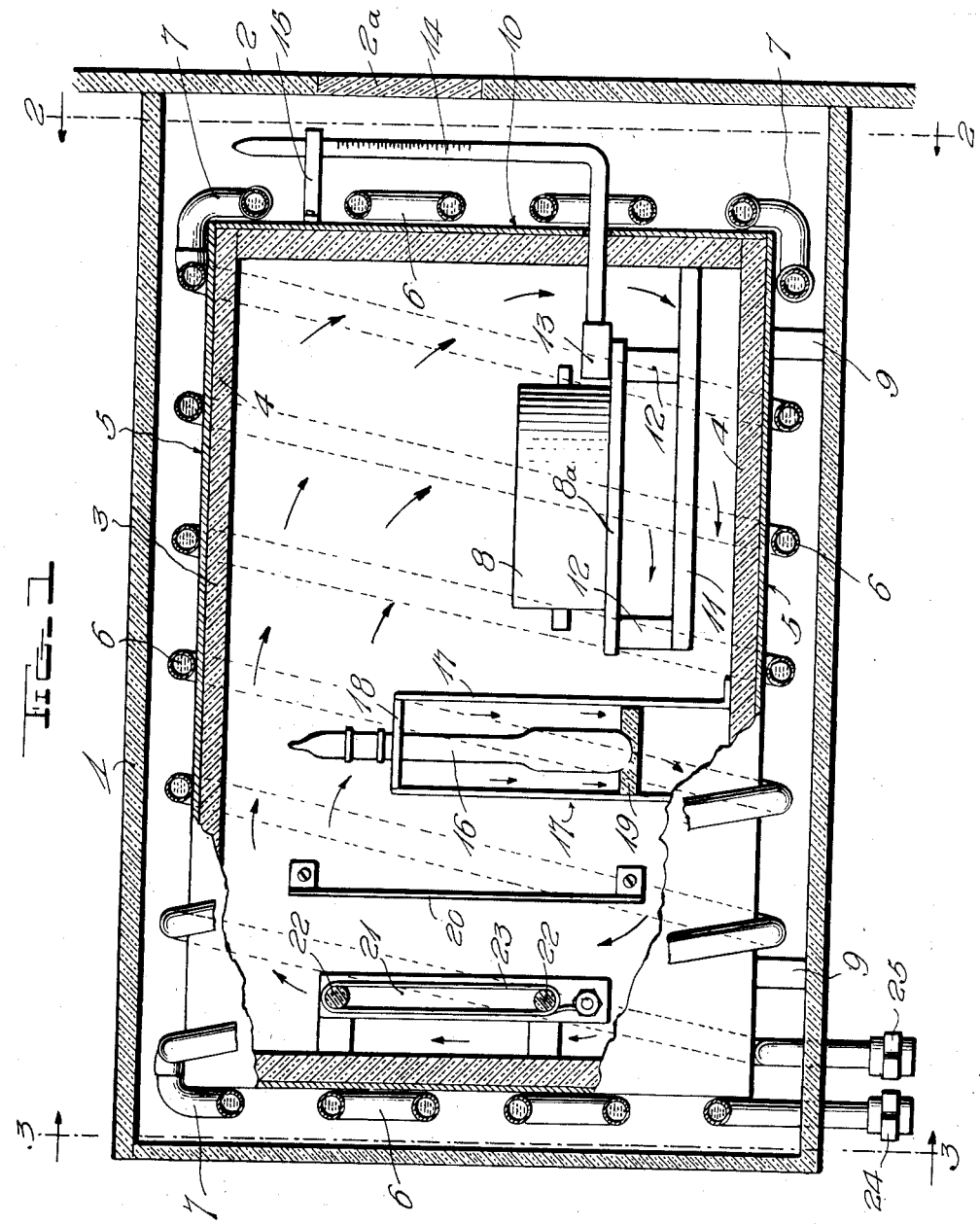
INVENTOR.
Louis A. Gebhard,
BY
ATTORNEY.

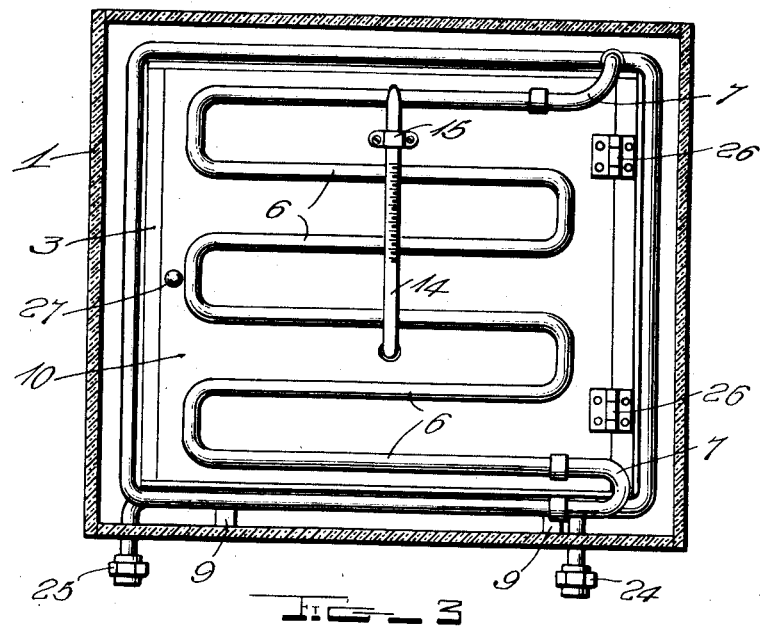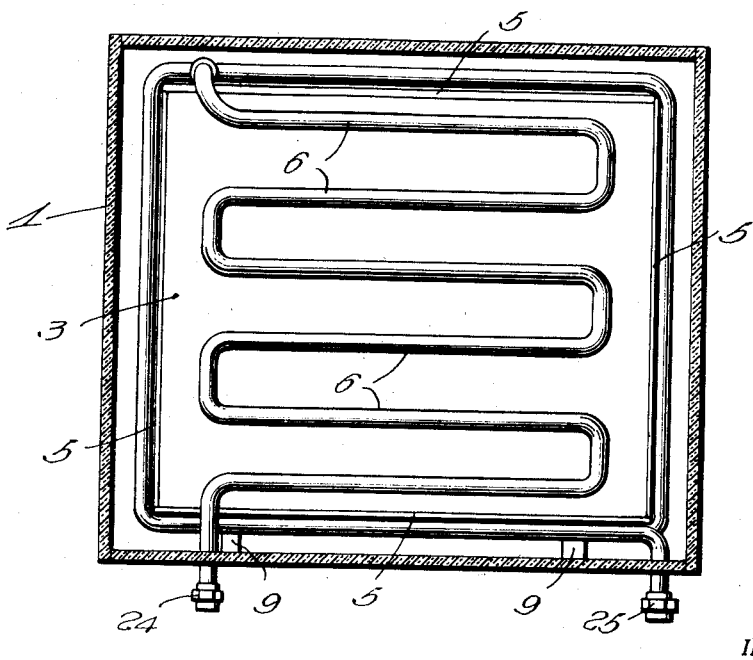

Patented Aug. 23, 1932

1,873,838

UNITED STATES PATENT OFFICE

LOUIS A. GEBHARD, OF WASHINGTON, DISTRICT OF COLUMBIA, ASSIGNOR TO WIRED RADIO, INC., OF NEW YORK, N. Y., A CORPORATION OF DELAWARE

TEMPERATURE REGULATING APPARATUS FOR SIGNALING DEVICES

Application filed June 11, 1929. Serial No. 370,143.

My invention relates broadly to temperature control apparatus, and more particularly to temperature control of frequency stabilizing elements employed in signaling systems.

One of the objects of my invention is to provide an arrangement in which the temperature of electromechanical vibrator elements may be maintained at a predetermined substantially constant value.

Another object of my invention is to provide an arrangement in which the temperature of electromechanical vibrator elements may be maintained at a predetermined substantially constant value through wide ranges of high or low ambient temperatures.

Still another object of my invention is to provide an arrangement in which a heating and a cooling system are arranged to cooperate to maintain the temperature of an electromechanical vibrator element system substantially constant throughout wide variations of ambient temperature.

Other and further objects of my invention will be apparent to those skilled in the art to which this invention pertains from the following specification and the appended drawings.

In the operation of frequency controlling and stabilizing elements of the electromechanical vibrator type, such as the piezo electric crystal or the magnetostriction type, it is highly desirable to maintain the elements at a substantially uniform temperature. It is also very desirable to maintain the electromechanical vibrator elements at some predetermined temperature from which an increase or decrease in temperature of one or two degrees centigrade may be made without effecting a large change in the frequency characteristic of the elements; this is especially desirable in cases where the piezo electric crystal type of vibrator is employed. Electromechanical vibrators calibrated for a definite frequency at an operating temperature of 20° centigrade must be maintained at substantially 20° centigrade if the transmitting station is to operate on the assigned frequency. Where provision is made for only heating the electromechanical vibrator element compartment up to a predetermined temperature, difficulty is experienced in the operation of the element when the ambient temperature becomes greater than the temperature at which the element was calibrated.

This latter difficulty is often encountered in cases where a ship transmitting station is equipped with an electromechanical vibrator calibrated at a low temperature, such as 20° centigrade, and the ship is employed in making regular trips between the temperate and the tropical zones of the earth.

According to my invention provision is made for heating the interior of the electromechanical vibrator housing and for cooling a space between the housing and an outer casing surrounding the housing. When the ambient temperature is higher than the calibration temperature of the vibrator element, the cooling system surrounding the housing of the vibrator element functions to prevent the ambient temperature from causing the temperature within the housing to increase to a point above the calibration temperature and the heating system within the housing operates to maintain the temperature of the medium surrounding the vibrator element substantially at the calibration temperature.

In the drawings, Figure 1 is a cross-sectional view in vertical elevation of the preferred embodiment of my invention; Fig. 2 is a cross-sectional view along the line 2—2 of Fig. 1 of the exterior of the electromechanical vibrator housing; and Fig. 3 is a cross-sectional view along the line 3—3 of Fig. 1 in vertical elevation of the rear of the electromechanical vibrator housing.

Reference numeral 1 of Fig. 1 of the drawings designates a container having a front wall 2 which may be the panel of a signal transmitting arrangement with which the apparatus housed in the container 1 is associated. Container 1 is heat insulated in a proper manner. A housing 3 for the electromechanical vibrator holder 8 is supported within the container 1 by the spacers 9 which are preferably of insulating material. Walls of the housing 3 are made up of an exterior layer 5 of metallic material, such as copper or aluminum, and an inner layer 4 of heat insulating material having a cellular or pulpy composition. Metallic cooling tubes 6 are mounted either upon the metallic layer 5 of the housing 3 or adjacent thereto within the spaces between the container 1 and the housing 3. Flexible connections 7 are provided between the cooling tubes positioned upon the top and bottom of the housing 3 and the tube positioned upon the front so that the front 10 which is hinged to the housing may be opened. The flexible connections 7 are positioned adjacent to the hinged edge of the front 10 in order that the front may be opened without removing or otherwise disturbing the connections. A plate 11 of metallic material is supported upon the inner surface of the wall 10. Spacers 12 are positioned upon the plate 11 for supporting the electromechanical vibrator holder 8. A socket 13 for receiving the bulb of a thermometer 14 is attached to the base 8a of the electromechanical vibrator holder 8. A bracket 15 is positioned on the exterior of the front 10 for supporting the calibrated portion of the thermometer 14 in erect position directly behind the transparent member 2a which is adjacent the panel 2.

A thermostat 16 is supported by the standards 17 to which the cross pieces 18 and 19, which are of heat insulating material, are provided. A baffle 20, which is preferably of heat resistant material, such as mica, is mounted in the housing 3 adjacent the heating unit 21 for guiding the circulation of the mobile medium within the housing and for preventing heat generated by the unit 21 from being radiated directly to the thermostat 16. The heating unit 21 is made up of conducting material 23, such as an alloy of nickel, iron and chromium, in the form of wire or ribbon, wound upon heat resisting rods 22 of mica or similar material, which are supported upon the rear wall of the housing 3. Connections 24 and 25 are provided to the ends of the cooling tube 6 for coupling the tube to a reservoir of the circulating cooling medium or a circulating system. The manner in which the cooling tubes 6 are mounted upon the front 10 of the housing 3 is illustrated in Fig. 2 of the drawings. The hinges 26 are attached to the door 10 adjacent the flexible tube connections 7. A knob 27 is also provided on the door 10. The cooling tube 6 is mounted upon the rear wall of the housing 3 in a manner, illustrated in Fig. 3, similar to that in which it is positioned upon the front of the housing. Connection between a portion of the tube 6 which is wound about the top, bottom and side walls of the housing 3 and the portion of the tube which is mounted on the rear wall of the housing is made at the top.

It is, of course, apparent that the tube 6 may be mounted upon the housing 3 in many different ways to accomplish the purpose of reducing and maintaining the temperature of the medium surrounding the housing 3 to a predetermined value and that various modifications may be made in the details of my invention without departing from the spirit and scope thereof, that therefore I do not desire to restrict my invention to the exact details as set forth in the foregoing specification except in so far as these details may be defined in the appended claims.

What I claim as new and desire to secure by Letters Patent of the United States is as follows:

1. In a temperature control system for use at ambient temperatures exceeding the operating temperature, a heat insulated housing containing an element to be maintained at a determined operating temperature, an electric heating element in said housing, a thermostat in said housing connected for actuating said heating element when the temperature inside said housing falls below said determined operating temperature, a heat insulated cabinet surrounding said housing but spaced therefrom, and cooling fluid conducting members positioned in the space between said cabinet and said housing and adapted to apply to the exterior of said housing a temperature below said determined operating temperature.

2. In a temperature control system for use at ambient temperatures exceeding the operating temperature, a heat insulated housing for containing an element to be maintained at a determined operating temperature, said housing having metal plate members on external surfaces thereof, an electric heating element in said housing, a thermostat in said housing connected for actuating said heating element when the temperature inside said housing falls below said determined operating temperature, a heat insulated cabinet surrounding said housing but spaced therefrom, and cooling fluid conducting members positioned in the space between said cabinet and said housing and adjacent said plate members and adapted to apply to the exterior of said housing a temperature below said determined operating temperature.

3. In a temperature control system for use at ambient temperatures exceeding the operating temperature, a heat insulated housing for containing an element to be maintained at a determined operating temperature, said housing having metal plate members on external surfaces thereof, an electric heating element in said housing, a thermostat in said housing connected for actuating said heating element when the temperature inside said housing falls below said determined operating temperature, a heat insulated cabinet surrounding said housing but spaced therefrom, a system of liquid conducting members adjacent said plate members and positioned in the space between said cabinet and said housing and adapted to apply to the exterior of said housing a temperature below said determined operating temperature, said housing having a door therein for gaining access thereto, liquid conducting members mounted on the exterior of said door, and flexible fluid conductors connecting said fluid conducting members adjacent said door to the fluid conducting members adjacent other faces of said housing.

4. In a temperature control system for use at ambient temperatures exceeding the operating temperature, a primary heat insulated housing for containing an element to be maintained at a determined operating temperature, an electric heating element in said housing, a thermostat in said housing connected for actuating said heating element when the temperature inside said housing falls below said determined operating temperature, a secondary heat insulated housing surrounding said primary housing in spaced relation, and a system of liquid conducting members intermediate said primary housing and said secondary housing and adapted to apply to the exterior of said primary housing a temperature below said determined operating temperature.

LOUIS A. GEBHARD.